United States Patent
Chu et al.

(10) Patent No.: US 6,621,624 B2
(45) Date of Patent: Sep. 16, 2003

(54) OPTICAL GAIN FIBERS

(75) Inventors: Polly W. Chu, Wilmington, NC (US); Adam J. G. Ellison, Corning, NY (US); Douglas E. Goforth, Painted Post, NY (US); Daniel W. Hawtof, Painted Post, NY (US); Joseph M. Whalen, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/044,027

(22) Filed: Jan. 10, 2002

(65) Prior Publication Data

US 2002/0196529 A1 Dec. 26, 2002

Related U.S. Application Data

(63) Continuation-in-part of application No. 09/464,148, filed on Dec. 16, 1999, now abandoned.

(51) Int. Cl.⁷ ................................................. H01S 3/00
(52) U.S. Cl. ............................. 359/341.1; 359/337.1; 359/341.5
(58) Field of Search ..................... 359/341.1, 341.5, 359/337.1

(56) References Cited

U.S. PATENT DOCUMENTS

| | | | |
|---|---|---|---|
| 3,599,114 A | | 8/1971 | Snitzer et al. |
| 5,111,334 A | | 5/1992 | Heidemann |
| 5,260,823 A | * | 11/1993 | Payne et al. ............... 359/341 |
| 5,282,079 A | | 1/1994 | Laming et al. |
| 5,526,175 A | | 6/1996 | Minelly et al. |
| 5,622,750 A | | 4/1997 | Kilian et al. |
| 5,703,191 A | | 12/1997 | Henderson et al. |
| 6,410,467 B1 | * | 6/2002 | Dickinson et al. ............ 501/37 |
| 6,503,860 B1 | * | 1/2003 | Dickinson et al. ............ 501/41 |

FOREIGN PATENT DOCUMENTS

JP    408333131 A  * 12/1996

OTHER PUBLICATIONS

C. Randy Giles and Emmanuel Desurvire, "Modeling Erbium–Doped Fiber Amplifiers," *Journal of Light–Waves Technology*, 9(2):271–283 (1991).

T. F. Morse, A Kilian and L. Reinhard, "Aerosol Techniques for Glass Formation," *Journal of Non–Crystalline Solids*, 129:93–100 (1991).

* cited by examiner

*Primary Examiner*—Mark Hellner
(74) *Attorney, Agent, or Firm*—Walter M. Douglas

(57) ABSTRACT

Disclosed are optical gain fibers which include an erbium-containing core and a cladding surrounding the core and which have ripple of less than about 25% over about a 40 nm wide window or ripple of less than about 15% over about a 32 nm wide window, or both. In one embodiment, the optical gain fibers are pumpable at 980 nm and at 1480 nm. In another embodiment, the optical gain fibers are fusion sliceable. In yet another embodiment, the core includes oxides erbium; the cladding includes silicon dioxide; and the optical gain fiber has a passive loss of less than about 0.5% of the peak absorption of the erbium absorption band in the vicinity of 1530 nm. The optical gain fibers of the present invention have a wider gain window, improved flatness across the gain window, and/or increased gain as compared to conventional optical gain fibers. Accordingly, they are useful in amplifying optical signals, particularly signals which need to be repeatedly amplified over the course of a long-haul transmission, without losses in the signal quality that are commonly encountered in conventional optical signal amplifying methods.

30 Claims, 4 Drawing Sheets

OPTICAL GAIN FIBERS

CROSS-REFERENCE TO RELATED APPLICATIONS

This application is a Continuation-in-Part of U.S. patent application Ser. No. 09/464,148, entitled "OPTICAL GAIN FIBERS", filed on Dec. 16, 1999 and now abandoned, which is incorporated herein by reference.

FIELD OF THE INVENTION

The subject invention is directed, generally, to optical gain fibers and, more particularly, to optical gain fibers that are pumpable at 980 nm and at 1480 nm, that have low ripple, that have low passive loss, and that are fusion sliceable.

BACKGROUND OF THE INVENTION

In recent times, the use of optical fiber communications has increased dramatically, and the promise of increased signal transmission speed and clarity makes it likely that the use of optical fibers for signal transmission will continue to grow in the future. Optical fiber technology can be used to transmit a variety of signals. For example, telecommunication, sensor, medical, and video transmissions can all take advantage of optical technology, particularly where virtually unlimited bandwidth and low attenuation are beneficial. Cable television systems are one example where optical fiber technology is providing efficient and economical alternatives to prior coaxial cable distribution schemes.

As optical signals are propagated through an optical fiber the signals becomes attenuated. The degree of attenuation is generally proportional to the length of the optical fiber carrying the signal. Thus, one of the obstacles to long haul transmission systems is the need for signal regeneration. Conventionally, this has been accomplished electrically by transforming the optical signal to electric signals, amplifying the electrical signals using conventional electrical signal amplification techniques, and converting the amplified electrical signals to optical signals. This process introduces several signal manipulations, any one of which can result in the loss of signal quality. As this process is repeated over the course of a long-haul transmission, these losses in the signal quality can give rise to significant problems.

In response to this problem, the use of optical gain fibers has been described. Fiber gain modules use electromagnetic energy to pump an optical signal without first converting the optical signal to an electrical signal. The medium in which such pumping is carried out contains a fiber that is doped with certain rare earth metals, particularly erbium. However, such optical gain fibers have narrow operating windows immediately around 1550 nm, and the flatness of gain over the operating window is fairly low. As a result, while these optical gain fibers are suitable for amplifying optical signals that have a narrow bandwidth centered at 1550 nm, they produce uneven gain in cases where the signals have broader bandwidths or are not precisely centered at 1550 nm.

Accordingly, a need exists for optical gain fibers having a wider gain window and improved flatness across the gain window. The present invention is directed to meeting this need.

SUMMARY OF THE INVENTION

The present invention relates to an optical gain fiber which includes a core and a cladding surrounding the core. The core includes erbium, is substantially free of fluorine, and the optical gain fiber is pumpable at 980 nm and at 1480 nm. In addition, the optical gain fiber has ripple of less than about 25% over about a 40 nm wide window or ripple of less than about 15% over about a 32 nm wide window, or both.

The present invention also relates to another optical gain fiber. This optical gain fiber includes a core and a cladding surrounding the core. The core includes erbium, is substantially free of fluorine, and the optical gain fiber is fusion sliceable and has ripple of less than about 25% over about a 40 nm wide window or ripple of less than about 15% over about a 32 nm wide window, or both.

The present invention further relates to yet another optical gain fiber. This optical gain fiber includes a core and a cladding surrounding the core. The core includes oxides of erbium, and is substantially free of fluorine, and the cladding includes oxides of silicon. The optical gain fiber has a passive loss of less than about 0.5% of the peak absorption of the erbium absorption band in the vicinity of 1530 nm. In addition, the optical gain fiber has ripple of less than about 25% over about a 40 nm wide window or ripple of less than about 15% over about a 32 nm wide window, or both.

The optical gain fibers of the present invention have a wider gain window and/or improved flatness across the gain window as compared to conventional optical gain fibers. Furthermore, the optical gain fibers of the present invention has enhanced net gain per unit length at equivalent inversion relative to conventional erbium-doped optical gain fibers. Accordingly, the optical gain fibers of the present invention are useful in amplifying optical signals, particularly signals which need to be repeatedly amplified over the course of a long-haul transmission, without losses in the signal quality that are commonly encountered in conventional optical signal amplifying methods.

DETAILED DESCRIPTION OF THE INVENTION

Figure 1:
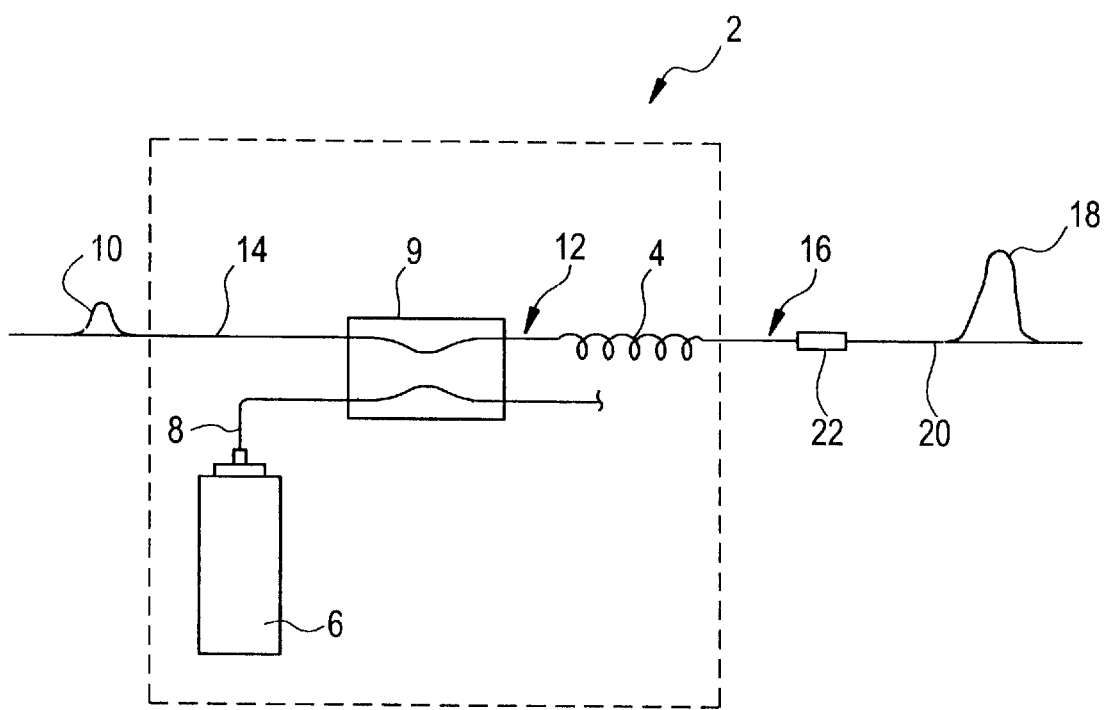
FIG. 1 is a diagram illustrating an optical amplifier which includes an optical gain fiber according to the present invention.

The present invention relates to an optical gain fiber which includes a core and a cladding surrounding the core. The core includes erbium, and is substantially free of fluorine, and the optical gain fiber is pumpable at 980 nm and at 1480 nm. In addition, the optical gain fiber has ripple of less than about 25% over about a 40 nm wide window or ripple of less than about 15% over about a 32 nm wide window, or both.

The present invention also relates to another optical gain fiber. This optical gain fiber includes a core and a cladding surrounding the core. The core includes erbium, and is substantially free of fluorine, and the optical gain fiber is fusion sliceable and has ripple of less than about 25% over about a 40 nm wide window or ripple of less than about 15% over about a 32 nm wide window, or both.

The present invention further relates to yet another optical gain fiber. This optical gain fiber includes a core and a cladding surrounding the core. The core includes oxides of erbium, and is substantially free of fluorine, and the cladding includes silicon dioxide. The optical gain fiber has a passive loss of less than about 0.5% of the peak absorption of the erbium absorption band in the vicinity of 1530 nm. In addition, the optical gain fiber has ripple of less than about 25% over about a 40 nm wide window or ripple of less than about 15% over about a 32 nm wide window, or both.

"Ripple", as used herein, is a measure of the flatness of the optical gain fiber's gain over a region (or "window") of the electromagnetic spectrum. More particularly, gain at any particular wavelength is calculated, for a particular wavelength, $\lambda$, using the equation:

$$(\text{gain})_\lambda = L[(n_2 \times g^*_\lambda) - \alpha_\lambda(1-n_2)]$$

where $(\text{gain})_\lambda$ is the gain at wavelength $\lambda$ (typically expressed in dB/m); $n_2$ is the average fraction of ions in the excited state along the length of the fiber; $g^*_\lambda$ represents the gain at wavelength $\lambda$ at full inversion (i.e., when $n_2$ is 1) (typically expressed in dB/m); $\alpha_\lambda$ is the absorption (i.e., the small signal loss (attenuation) coefficient) (typically expressed in dB/m) at wavelength $\lambda$; and L is the length of the fiber.

$n_2$ is dependent on pump power. Pump power is optimized to minimize ripple. For the purpose of calculating ripple, the pump power (and, consequently, average inversion (i.e., $n_2$)) is adjusted to give a minimum ripple over the wavelength window of interest.

$g^*$ is determined from fluorescence measurements. The shape of the fully inverted gain spectrum (i.e., a plot of $g^*$ as a function of $\lambda$) is proportional to fluorescence. Typically, the fluorescence spectrum is measured by pumping a short length (e.g., less than 4 cm) of fiber at 980 nm (e.g., with an GaAs/GaAlAs laser) and measuring the fluorescence (i.e., spontaneous emission from the excited state) as a function of wavelength. The fluorescence spectrum, thus measured, gives an arbitrary amount of signal, so that the shape of the $g^*$ spectrum is established. $g^*$ is then normalized to one (e.g., by dividing the value of $g^*$ at each $\lambda$ by the maximum $g^*$ obtained in the wavelength window of interest).

Absorption, $\alpha$, at each $\lambda$ is measured by the cutback method. A small signal is injected into one end of the fiber, and the signal at wavelength $\lambda$ is measured at the other end. The fiber is then cut back by a length equivalent to about 20 dB, and the signal is measured again. Absorption at wavelength $\lambda$ (i.e., $\alpha_\lambda$) (e.g., expressed in dB)) is then calculated by subtracting the second signal measurement from the first signal measurement and then dividing by the cutback length. The process is repeated for each wavelength $\lambda$ over the wavelength window of interest, and $\alpha_\lambda$ is then normalized to one (e.g., by dividing the value of $\alpha$ at each $\lambda$ by the maximum $\alpha_\lambda$ obtained in the wavelength window of interest).

Typically, the length of the fiber is chosen so as to provide a measurable absorption and fluorescence, and the measured absorption, $\alpha$, and the measured fluorescence (and, therefore, $g^*_\lambda$) is divided by the fiber's length, L, so that the values of $\alpha_\lambda$, $g^*_\lambda$, and $(\text{gain})_\lambda$ are expressed as dB per unit length (e.g., dB/m).

Thus, the gain calculation requires measuring fluorescence and absorption at each wavelength $\lambda$. Any known method can be used for measuring the absorbance and fluorescence at wavelength $\lambda$. Advantageously, a diode array instrument can be used to instantaneously capture absorption or fluorescence data over the entire wavelength window of interest. The fluorescence and absorption spectra are each normalized, and these normalized fluorescence and absorption spectra are used in the above equation to calculate, wavelength by wavelength, a gain spectrum.

Further details relating to the measurement and calculation of gain can be found, for example, in C. Randy Giles and Emmanuel Desurvire, "Modeling Erbium-Doped Fiber Amplifiers," *Journal of Light-Waves Technology*, 9(2):271–283 (1991), which is hereby incorporated by reference.

Within any particular window of the electromagnetic spectrum, there will exist a maximum and minimum gain for a given optical gain fiber. Ripple, within the window is then defined, for purposes of the present application, as the difference between the maximum gain and the minimum gain divided by the minimum gain, i.e., $$\text{ripple}(\lambda_2, \lambda_1) = \frac{(\text{gain}(\lambda_2, \lambda_1))_{max} - (\text{gain}(\lambda_2, \lambda_1))_{min}}{(\text{gain}(\lambda_2, \lambda_1))_{min}}$$

where $\text{ripple}(\lambda_2, \lambda_1)$ is the ripple for a window extending from $\lambda_1$ to $\lambda_2$, $(\text{gain}(\lambda_2, \lambda_1))_{max}$ is the maximum gain in the window extending from $\lambda_1$ to $\lambda_2$, and $(\text{gain}(\lambda_2, \lambda_1))_{min}$ is the minimum gain in the window extending from $\lambda_1$ to $\lambda_2$. As one skilled in the art will recognize, ripple will generally be greater for windows of larger size. For example, the optical gain fibers of the present invention can have ripple of less than about 25% (i.e., less than 0.25), preferably less than about 22%, more preferably less than about 20%, and still more preferably less than about 17%, over a window of about 40 nm. The exact location of the 40 nm window is not critical to the practice of the present invention. Preferably, the window includes 1550 nm (e.g., from 1510 to 1550 nm, from 1520 to 1560 nm, from 1530 to 1570 nm, from 1540 to 1580 nm, from 1550 to 1590 nm, etc.). Additionally or alternatively, the optical gain fibers of the present invention can have ripple of less than about 15% (i.e., less than 0.15), preferably less than about 13%, more preferably less than about 11%, and still more preferably less than about 10%, over a window of about 32 nm. The exact location of the 32 nm window is not critical to the practice of the present invention. Preferably, the window includes 1550 nm (e.g., from 1518 to 1550 nm, from 1526 to 1558 nm, from 1534 to 1566 nm, from 1542 to 1574 nm, from 1550 to 1582 nm, etc.). Of course, the present invention is meant to include optical gain fibers which have two or more windows of the sizes specified which meet the criteria regarding ripple set forth above. Preferred optical gain fibers of the present invention are those which also have a maximum gain (i.e., at full inversion) of greater than about 15 dB per meter, greater than about 20 dB per meter, greater than about 25 dB per meter, greater than about 30 dB per meter, greater than about 35 dB per meter, or greater than about 40 dB per meter. The wavelength of this maximum gain is preferably in the window having low ripple, as described above. Typically, an optical gain fiber's maximum gain can be increased by increasing the amount of erbium oxide in the fiber.

"Pumpable at 980 nm and at 1480 nm", as used herein, means that the optical gain fiber of the present invention can be excited by light having a wavelength of about 980 nm (e.g., by light from a GaAs/GaAlAs laser) and by light having a wavelength of about 1480 nm e.g., by light from a InGaAsP laser). In practice, the optical gain fiber can be pumped by either one or the other of these light sources or by both. Whether the optical gain fiber of the present invention can be excited at other wavelengths (e.g., by the 514.4 nm light from an $Ar^+$ ion laser) is not critical to the practice of the present invention.

As indicated above, the optical gain fibers of the present invention include a core and a cladding which surrounds the core. The cladding is preferable made of a material which renders the fiber fusion sliceable. That is, it is preferred that the fiber include a cladding which permits connecting the optical gain fiber to other optical fibers or devices by fusion splicing techniques, such as by heating, as opposed to by using adhesives or other methods.

Also as indicated above, it is preferred that the cladding used in the optical gain fiber of the present invention contains silicon dioxide. Although the cladding layer may contain other materials known to those of skill in the art, it preferably contains no fluorine atoms (e.g., in the form of silicon fluoride, etc.). Alternatively, the cladding layer can contain some fluorine atoms, but, preferably, the amount of such fluorine present is such that the ratio of the number of moles of fluorine atoms in the cladding to the number of moles of silicon atoms in the cladding is less than about 0.05 (i.e., less than about 5%), more preferably, less than about 0.02, and, still more preferably, less than about 0.005.

The core of the optical gain fibers of the present invention can be made from a glass which includes erbium (e.g., oxides of erbium) and which includes oxides of aluminum; oxides of silicon; and, optionally, oxides of one or more metal selected from the group consisting of yttrium, lanthanum, gadolinium, and lutetium.

Preferred cores of the optical gain fibers of the present invention include oxides of aluminum in amounts of from about 6 weight percent to about 20 weight percent of the total weight of the oxides of aluminum, erbium, and silicon; and oxides of erbium in amounts of from about 0.05 weight percent to about 5 weight percent (e.g., in amounts of about 0.05, 0.10, 0.15, 0.20, 0.25, 0.30, 0.35, 0.40, 0.45, 0.50, 1, 1.5, 2, 2.5, 3, 3.5, 4, 4.5, or 5 weight percent) of the total weight of the oxides of aluminum, erbium, and silicon. The cores of the optical gain fibers of the present invention can also include other materials, such as oxides of other elements. For example, the cores of the optical gain fibers of the present invention can also include oxides of antimony. Illustratively, a core of an optical gain fiber of the present invention can include oxides of aluminum in an amount of from about 6 weight percent to about 20 weight percent of the total weight of the oxides of aluminum, erbium, antimony, and silicon; oxides of erbium in an amount of from about 0.05 weight percent of the total weight of the oxides of aluminum, erbium, antimony, and silicon; and oxides of antimony in an amount of from about 0.5 weight percent to about 60 weight percent (e.g., in an amount of about 0.5, 0.6, 0.7, 0.8, 0.9, 1, 2, 3, 4, 5, 6, 7, 8, 9, 10, 15, 20, 25, 30, 35, 40, 50, or 60 weight percent) of the total weight of the oxides of aluminum, erbium, antimony, and silicon.

The chemical composition of the cores of the optical gain fibers of the present invention can be determined by any conventional method, for example, by atomic absorption spectroscopy. Once the ratios between the various metals present in the cores are determined, the weight of their counterpart oxides can be calculated. For this purpose, it is generally assumed that all metal present in the glass is in the form of its conventional oxide (e.g., that all aluminum is present in the form of $Al_2O_3$, that all silicon is present in the form of $SiO_2$, that all antimony is present in the form of $Sb_2O_3$, and that all erbium is present in the form of $Er_2O_3$).

The cores of the optical gain fibers of the present invention can contain other metals (i.e., metals other than silicon, aluminum, antimony, erbium, yttrium, lanthanum, gadolinium, and lutetium), for example, those that are commonly employed in the optical glass making art, examples of which include germanium, tantalum, and titanium. Other materials that are commonly used in optical glasses can also be included, for example compounds containing boron and phosphorus. Preferably, the other metals and materials that are present in the cores of the fibers of the present invention do not adversely effect the transmission of optical signals and do not adversely effect the ease with which the core is drawn into a fiber.

As indicated above, the cores of the optical gain fibers of the present invention can include oxides of germanium. However, when oxides of germanium are present, they are preferably present in an amount less than about 20%, more preferably less than 10%, and still more preferably less than 5% by weight, of the amount of oxide in the core. Most preferably, the cores of the optical gain fibers of the present invention contain no germanium oxide or no substantial amounts of germanium oxide.

The optical gain fibers of the present invention, in addition to having low ripple, as described above, preferably also have low passive loss. Passive loss, as one skilled in the art will recognize, refers to losses in signal intensity, for example, caused by scattering and undesirable absorptions, such as by water molecules which may be present in the optical fiber. Passive loss can be measured in a variety of ways, such by measuring attenuation (e.g., in dB) per unit length of fiber, using for example a cut back measurement on a conventional PK bench. Measured in this way, the optical gain fibers of the present invention typically have passive losses of less than 50 dB per kilometer, preferably less than 30 dB per kilometer, and more preferably less than less than 10 dB per kilometer. Passive loss can also be measured relative to the peak absorption of the erbium absorption band in the vicinity of 1530 nm. As used herein, "erbium absorption band in the vicinity of 1530 nm" is meant to refer to the absorption band corresponding to the erbium ion's ground state, which is typically between 1510 nm and 1550 nm. As used herein, "peak absorption of the erbium absorption band in the vicinity of 1530 nm" is meant to refer to the maximum absorption of the absorption band corresponding to the erbium ion's ground state. Optical gain fibers of the present invention having passive losses of less than about 0.5% (preferably less than about 0.2%, more preferably less than about 0.1%) of the peak absorption of the erbium absorption band in the vicinity of 1530 nm can be readily attained. Typically, the optical gain fibers of the present invention have passive losses of between about 0.05% and about 0.5% of the peak absorption of the erbium absorption band in the vicinity of 1530 nm.

The optical gain fibers of the present invention can be prepared in conventional fashion, for example, by drawing or extrusion, from appropriate core and cladding materials.

Preferably the core is made of a glass which is formed using precursors that are capable of undergoing thermal oxidative decomposition to produce their respective oxides. Suitable precursors can be in the form of liquids or solids. In the case of solids, the solids are preferably ones that can be dissolved in a suitable solvent or in another precursor. Suitable precursors for the silicon oxide components of the core of the optical fibers of the present invention are tetraalkoxysilane (e.g., tetramethoxysilane and tetraethoxysilane) and octaalkylcyclotetrasiloxane (e.g., octamethylcyclotetrasiloxane). Suitable precursors for the aluminum oxide components of the core are aluminum alkoxides, examples of which include aluminum triethoxide, aluminum tri-n-propoxide, aluminum tri-i-propoxide, and aluminum tri-sec-butoxide, and aluminum β-diketonates, such as aluminum (III) acetylacetonate. Suitable precursors for the antimony oxide components (when included) of the core are antimony alkoxides, examples of which include antimony triethoxide, antimony tri-n-propoxide, antimony tri-i-propoxide, and antimony tri-sec-butoxide. Suitable precursors for the erbium oxide components of the core are erbium alkoxides, examples of which include erbium triethoxide, erbium tri-n-propoxide, erbium tri-i-propoxide, and erbium tri-sec-butoxide, and erbium tri-1,3-diketones, particularly erbium tri-(fluorinated 1,3-diketones), such as erbium tri-(6,6,7,7,8,8,8-heptafluoro-2,2-dimethyl-3,5-octanedionate), which is commonly referred to as $Er(FOD)_3$. Where the optional oxides of yttrium, lanthanum, gadolinium, and/or lutetium are employed, suitable precursors for the yttrium, lanthanum, gadolinium, and/or lutetium oxide components of the core are yttrium, lanthanum, gadolinium, and/or lutetium alkoxides, examples of which include yttrium, lanthanum, gadolinium, and/or lutetium triethoxide, yttrium, lanthanum, gadolinium, and/or lutetium tri-n-propoxide, yttrium, lanthanum, gadolinium, and/or lutetium tri-i-propoxide, and erbium tri-sec-butoxide, and yttrium, lanthanum, gadolinium, and/or lutetium tri-1,3-diketones, particularly yttrium, lanthanum, gadolinium, and/or lutetium tri-(fluorinated 1,3-diketones), such as yttrium, lanthanum, gadolinium, and/or lutetium tri-(6,6,7,7,8,8,8-heptafluoro-2,2-dimethyl-3,5-octanedionate).

As indicated above, in the case where the precursor is a liquid, it can be used neat (i.e., without the addition of solvent), or alternatively, it can be dissolved in a suitable solvent. In the case where some of the precursors are liquids and others are solids, the solid precursors can be mixed with the liquid precursors to produce a solution (assuming, of course, that the nature of these materials permits a solution to form). Alternatively, the solid precursor can be dissolved in a suitable solvent (other than liquid precursor), such as ethylene glycol, alcohols (e.g., methanol, ethanol, propanol, and butanol, particularly, 2-alkoxyethanols, such as 2-methoxyethanol), or combinations thereof.

The precursors are then delivered in liquid form, either individually or, preferably, as a mixture, directly into the flame of a combustion burner. In this manner, the precursors do not vaporize until just prior to or simultaneously with being converted into a finely divided amorphous soot.

On a small scale, the precursors used to make the cores of the optical gain fibers of the present invention can be delivered in liquid form using a syringe with a fine needle to produce a liquid stream at high velocity which is directed directly into the flame of the burner. Alternatively and especially in cases where the process is carried out on a large scale, atomizers can be employed. These are described, for example, in Lefebure, *Atomization and Sprays,* Hemisphere Publishing Co. (1989) and Bayvel et al., *Liquid Atomization,* Taylor & Francis (1993), which are hereby incorporated by reference. Particularly preferred atomizers for making the cores of the optical gain fibers of the present invention are air-blast atomizers. In some cases delivery of the atomized precursors can be assisted with a carrier gas, such as nitrogen and/or oxygen, which are preferably the gases used to atomize the precursors.

The burner into which the liquid precursors are directly delivered can be fueled, for example, by a combination of methane and oxygen. The thermal oxidative decomposition of the precursors produces a finely divided soot which can be deposited on a receptor surface, such as a rotatable mandrel. Substantially simultaneously with or subsequently to its deposition, the soot can be consolidated into a body of fused glass, for example by heating it in a furnace, using conventional glass forming methods.

Further details regarding the preferred method for preparing soot can be found in U.S. Provisional Patent Application Serial No. 60/095,736, which is hereby incorporated by reference.

The fused body of silica can then be drawn to make the optical gain fiber of the present invention as described, for example, in the "end-uses" section of U.S. Pat. No. 5,703,191, which is hereby incorporated by reference. Preferably, the fused body of silica is drawn into the optical gain fiber of the present invention using a direct draw process, as described in copending U.S. patent application Ser. No. 09/350,068, which is hereby incorporated by reference.

The optical gain fiber of the present invention can be used to amplify optical signals and can be used, for example, as a power amplifier, a pre-amplifier, or an in-line amplifier. It is believed that amplification is achieved by fractionally or completely inverting the erbium ions in the core, although this proposed mechanism is not meant to limit, in any way, the scope of the present invention. The nature of the signals being amplified is not particularly critical, although signals having wavelengths of from about 1510 nm to about 1600 nm, especially from about 1525 nm to about 1575 nm, are most affected by the optical gain fibers of the present invention. Signals to be amplified are delivered from a signal source to one end of the optical gain fiber, for example, via a conventional (input) optical fiber. Laser light is also made to enter the optical gain fiber (e.g., via a dichroic fiber coupler), and, as a result, the optical signals are amplified. The other end of the optical gain fiber is coupled to an optical component, such as a waveguide (for signal manipulation) or another conventional (output) optical fiber (for further transmission) of the now-amplified optical signals.

The laser used to amplify the optical signals preferably has a wavelength of about 980 nm or about 1480 nm (i.e., light from a GaAs/GaAlAs laser or a InGaAsP laser). Suitable lasers will be readily identifiable by those skilled in the art by, for example, reference to P. C. Becker, N. A. Olsson, and R. J. Simpson, *Erbium-Doped Fiber Amplifiers Fundamentals and Technology,* Academic Press (1999) ("Becker"), which is hereby incorporated by reference.

FIG. 1 illustrates a typical optical amplifier that can be constructed using an optical gain fiber according to the present invention. As shown there, optical amplifier 2 includes optical gain fiber 4 and laser 6. Laser 6, capable of emitting light having a wavelength of about 980 nm or 1480 nm, is in optical communication (e.g., via optical fiber 8 and dichroic fiber coupler 9) with optical gain fiber 4. In operation, input signal 10 (being transmitted, for example, via conventional optical fiber 14) enters input end 12 of optical gain fiber 4 (e.g., via dichroic fiber coupler 9), where it is amplified. The amplified signal then leaves optical gain fiber 4 through output end 16 of optical gain fiber 4 as amplified signal 18. Amplified signal 18 can then be further transmitted via output conventional optical fiber 20, which can be optically coupled to output end 16 of optical gain fiber 4 via fusion splice 22. Instead of having input optical signal 10 delivered via conventional optical fiber 14, as shown, it is also contemplated that input optical signal 10 can be delivered from another optical component, e.g., an optically active device, such as a waveguide. Alternatively or additionally, instead of having output optical signal 18 enter conventional optical fiber 20, as shown, it is contemplated that output optical signal 18 can be delivered to an optically active device, for example, an optical attenuator or another optical amplifier.

Further details regarding the use of optical gain fibers and the pumping thereof by lasers can be found, for example, in Becker, which is hereby incorporated by reference.

The present invention is further illustrated by the following examples.

EXAMPLES

Example 1

Preparation of Alkoxides of Si, Al, Er, and Sb

Silicon tetraethylorthosilicate (105.60 g, 0.5069 mol), aluminum tri(sec-butoxide) (18.25 g, 0.07409 mol), and erbium FOD (0.20 g, 0.00019 mol) were pipetted into an Erlenmeyer flask in a nitrogen filled glove box. The solution was pale white and slightly milky. The solution was allowed to stand for 60 hours, after which time a white gel had formed on the bottom and the solution became colorless. 125 ml of 2-methoxyethanol were added. The gel dissolved, and the solution remained clear. The solution was delivered directly to the flame of a methane/oxygen burner using a syringe and a delivery rate of 1–2 mL/min. The resulting soot was collected on a quartz rod and analyzed for Si, Al, and Er content. The results are presented in Table 1, below, along with the content of the oxide equivalent of Si, Al, and Er in the solution delivered to the burner.

TABLE 1

| Component | Wt % of component in solution | Wt % of component in soot |
| --- | --- | --- |
| $SiO_2$ | 88.9 | 90.9 |
| $Al_2O_3$ | 11.0 | 7.0 |
| $Er_2O_3$ | 0.10 | 0.08 |

Example 2

Cross-Sectional Compositional Analysis of Optical Gain Fibers

Figure 2A:
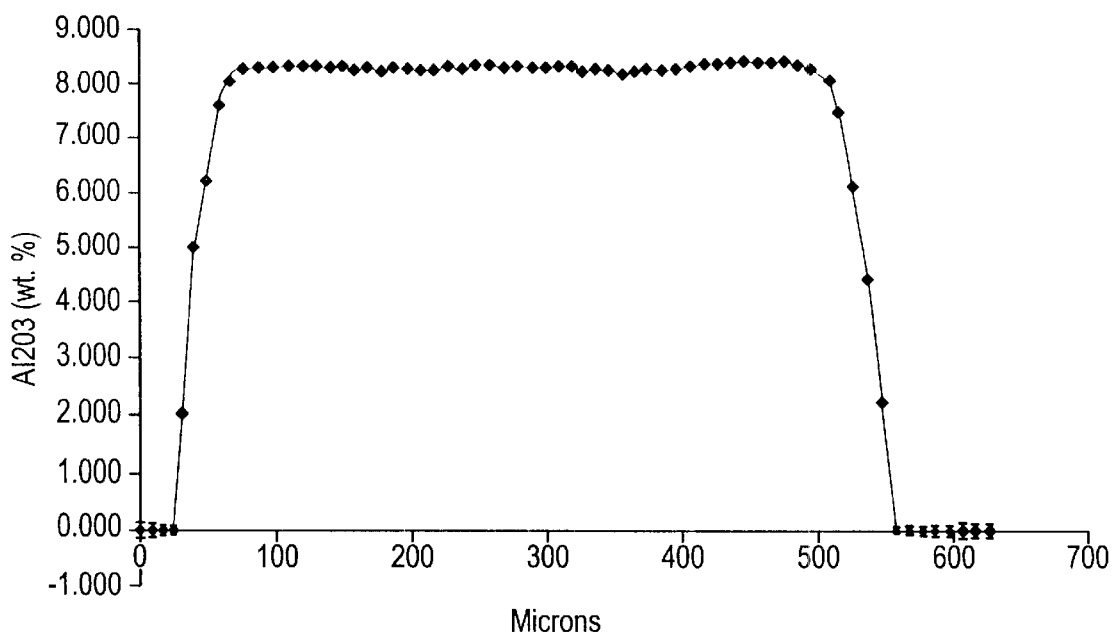
FIGS. 2A and 2B are graphs showing the core cross-sectional aluminum oxide (FIG. 2A) and erbium oxide (FIG. 2B) compositions of a blank used to produce an optical gain fiber according to the present invention.
Figure 2B:
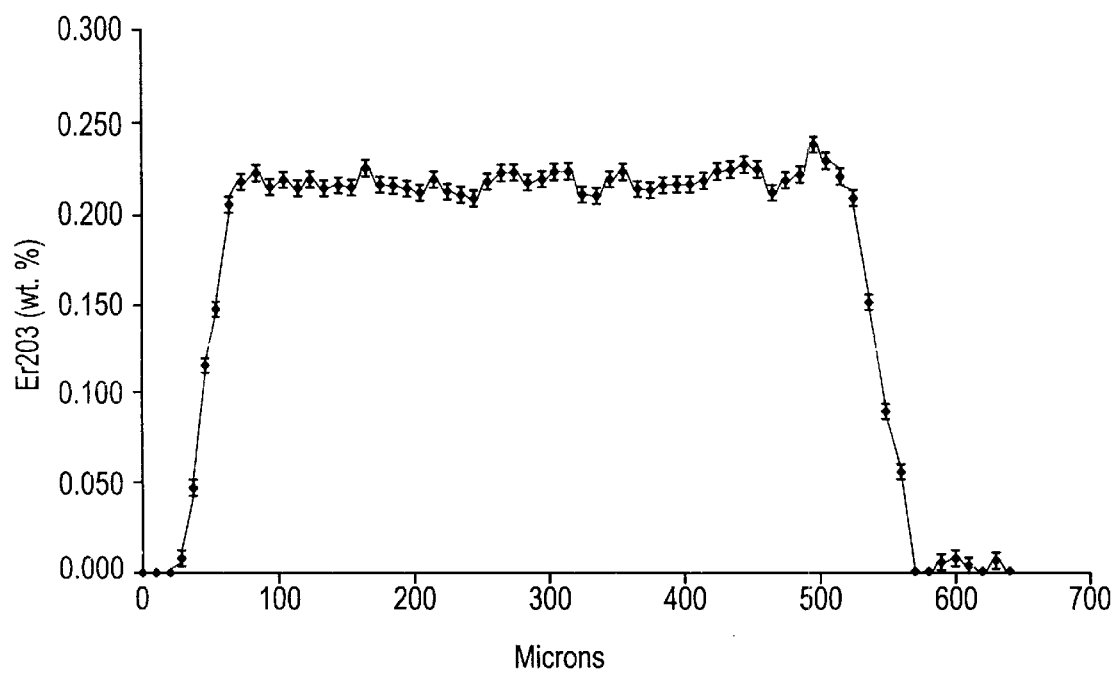

Using the method described in U.S. Provisional Patent Application Serial No. 60/095,736, which is hereby incorporated by reference, liquid precursors were delivered directly into the flame of a burner to produce soot. The soot was consolidated into fused glass, and a 95 μm fiber was drawn therefrom. The cross-sectional aluminum oxide concentration of a blank from which this fiber was drawn is shown in FIG. 2A, and the cross-sectional erbium oxide concentration of the blank is shown in FIG. 2B.

Example 3

Comparison of Fluorescence of Germanium-Containing and Germanium-Free Fibers

Using the method set forth in Example 2, a first fiber core, dubbed Argo 50, was produced from silica, alumina and erbia precursors. Using a conventional two-step outside vapor deposition ("OVD") process, a second fiber core, dubbed "Fiber X", was prepared from silica, alumina, germania, and erbia precursors. The compositions of the fibers were analyzed and the results are presented below in Table 2.

TABLE 2

| Component | Fiber X Core (wt %) | Argo 50 Core (wt %) |
| --- | --- | --- |
| $SiO_2$ | 79.575 | 91.6 |
| $Al_2O_3$ | 2.1 | 8.2 |
| $Er_2O_3$ | 0.0425 | 0.22 |
| $GeO_2$ | 17.9 | — |

Figure 3:
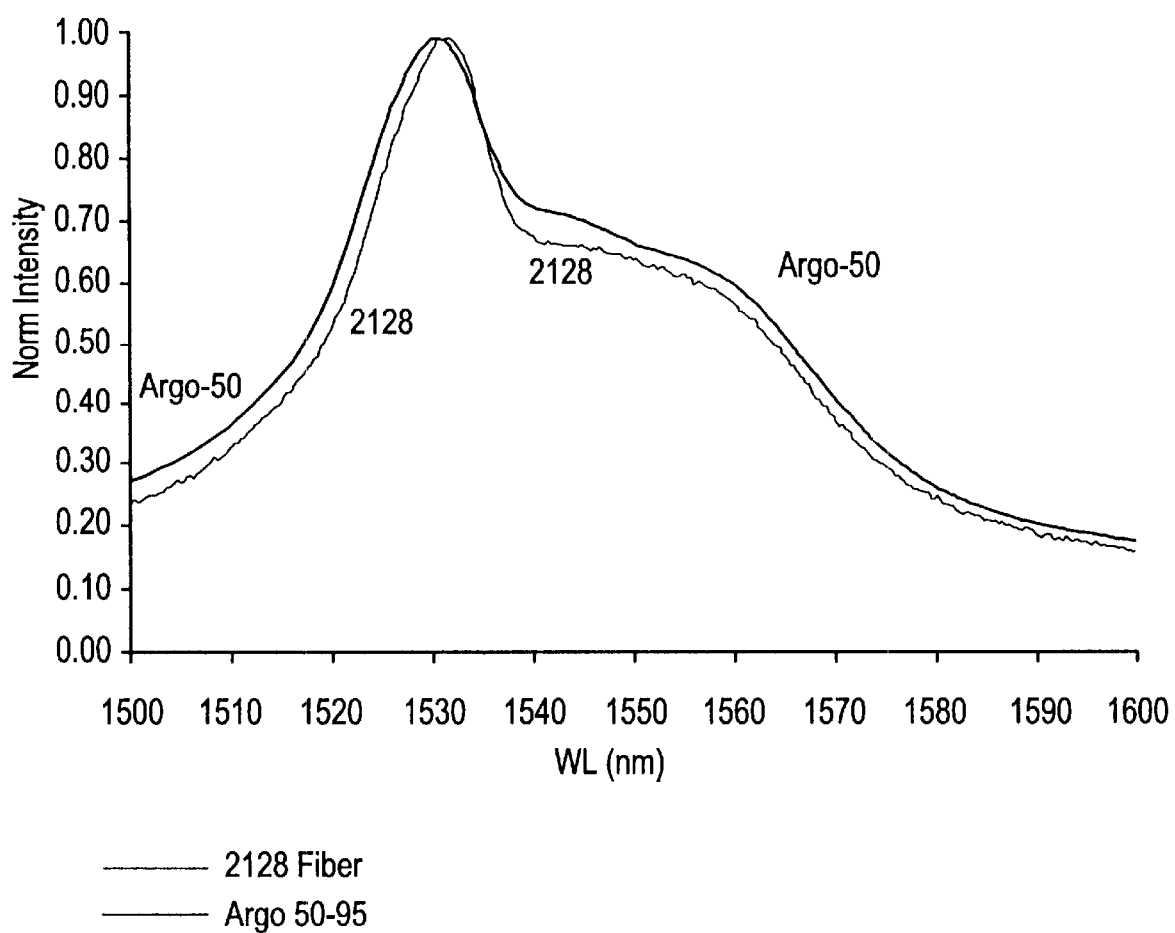
FIG. 3 is a graph showing the normalized fluorescence spectrum of an optical gain fiber according to the present invention (Argo 50) compared with conventional fiber X.

FIG. 3 shows the normalized intensity of the fluorescence from each of the fibers as a function of emitted wavelength when excited with a 980 nm light source. As FIG. 3 shows, the Argo 50 fiber (i.e., the fiber containing no germanium) has a broader fluorescence peak than does Fiber X (which contains germanium).

Example 4

Ripple Analysis of the Argo 50 Fiber

Figure 4:
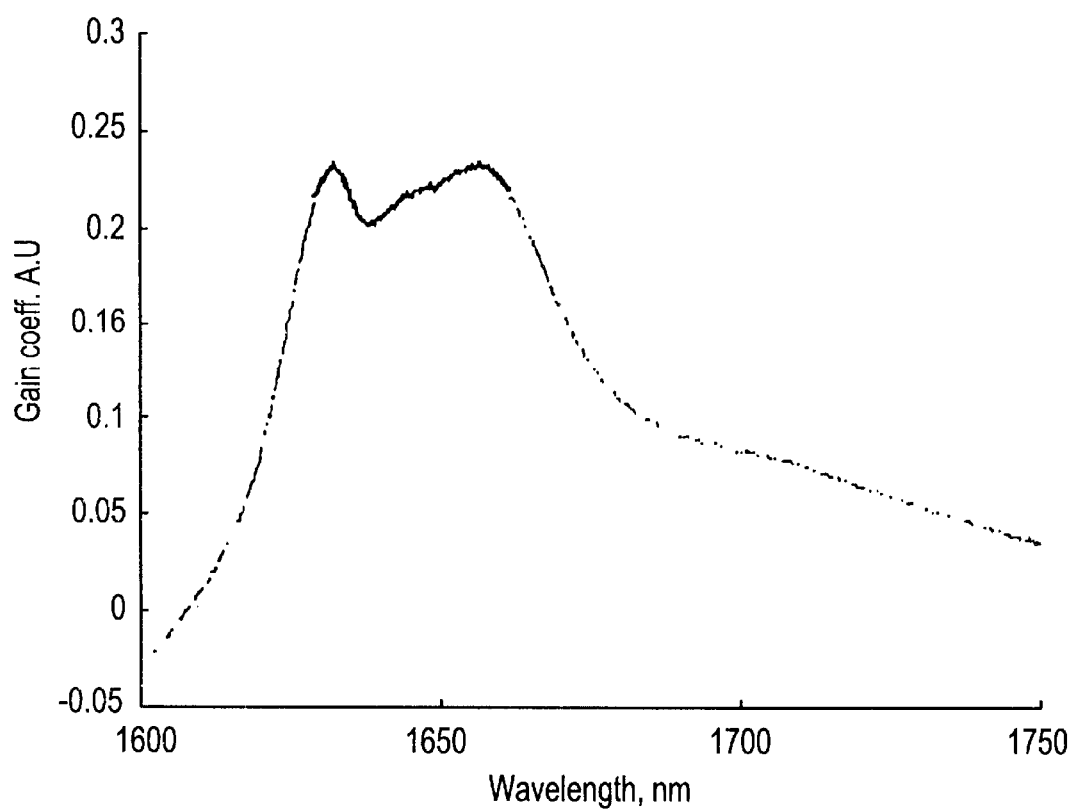
FIG. 4 is a graph of the gain as a function of wavelength for an optical gain fiber according to the present invention and for a conventional optical fiber.

FIG. 4 shows the gain as a function of wavelength for the Argo 50 fiber. Table 3, below, sets forth the ripple for various wavelength windows.

TABLE 3

| Low end of wavelength window (nm) | High end of wavelength window (nm) | Size of window (nm) | Ripple |
| --- | --- | --- | --- |
| 1529.2 | 1561.2 | 32 | 13.50% |
| 1529.2 | 1564.2 | 35 | 13.50% |
| 1528.2 | 1566.2 | 38 | 18.17% |
| 1527.8 | 1567.8 | 40 | 23.78% |
| 1525.0 | 1573.0 | 48 | 54.68% |

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. An optical gain fiber comprising:
   a core comprising erbium; and
   a cladding surrounding the core, wherein said optical gain fiber is pumpable at 980 nm and at 1480 nm and has ripple of less than about 25% over about a 40 nm wide window or ripple of less than about 15% over about a 32 nm wide window, or both, wherein said core is substantially free of fluorine.

2. An optical gain fiber according to claim 1, wherein said optical gain fiber has ripple of less than about 25% over about a 40 nm wide window.

3. An optical gain fiber according to claim 1, wherein said optical gain fiber has ripple of less than about 15% over about a 32 nm wide window.

4. An optical gain fiber according to claim 1, wherein said core comprises oxides of erbium.

5. An optical gain fiber according to claim 4, wherein said core further comprises oxides of silicon, oxides of aluminum, and, optionally, oxides of one or more metals selected from the group consisting of yttrium, lanthanum, gadolinium, and lutetium.

6. An optical gain fiber according to claim 4, wherein said core further comprises oxides of antimony.

7. An optical gain fiber according to claim 6, wherein the oxides of aluminum are present in an amount of from about 6 weight percent to about 20 weight percent of the total weight of the oxides of aluminum, erbium, antimony, and silicon; wherein the oxides of the erbium are present in an amount of from about 0.05 weight percent to about 5 weight percent of the total weight of the oxides of aluminum, erbium, antimony, and silicon; and wherein the oxides of antimony are present in an amount of from about 0.5 weight percent to about 60 weight percent of the total weight of the oxides of aluminum, erbium, antimony, and silicon.

8. An optical gain fiber according to claim 5, wherein said core comprises no oxides of germanium or wherein said core comprises oxides of germanium in an amount less than about 20%, by weight, of the amount of total oxide in said core.

9. An optical gain fiber according to claim 1, wherein the erbium has an absorption band in the vicinity of 1530 nm, and wherein said optical gain fiber has a passive loss of between 0.05% and about 0.5% of the peak absorption of the erbium absorption band in the vicinity of 1530 nm.

10. An optical gain fiber according to claim 1, wherein said optical gain fiber is fusion sliceable.

11. An optical gain fiber according to claim 1, wherein said optical gain fiber has a maximum gain of greater than about 15 dB per meter.

12. An optical gain fiber comprising:

a core comprising erbium; and a cladding surrounding the core, wherein said optical gain fiber is fusion sliceable and has ripple of less than about 25% over about a 40 nm wide window or ripple of less than about 15% over about a 32 nm wide window, or both;

wherein said core is substantially free of fluorine.

13. An optical gain fiber according to claim 12, wherein said optical gain fiber has ripple of less than about 25% over about a 40 nm wide window.

14. An optical gain fiber according to claim 12, wherein said optical gain fiber has ripple of less than about 15% over about a 32 nm wide window.

15. An optical gain fiber according to claim 12, wherein said core comprises oxides of erbium.

16. An optical gain fiber according to claim 15, wherein said core further comprises oxides of silicon, oxides of aluminum, and, optionally, oxides of one or more metals selected from the group consisting of yttrium, lanthanum, gadolinium, and lutetium.

17. An optical gain fiber according to claim 16, wherein said core further comprises oxides of antimony.

18. An optical gain fiber according to claim 17, wherein the oxides of aluminum are present in an amount of from about 6 weight percent to about 20 weight percent of the total weight of the oxides of aluminum, erbium, antimony, and silicon; wherein the oxides of the erbium are present in an amount of from about 0.05 weight percent to about 5 weight percent of the total weight of the oxides of aluminum, erbium, antimony, and silicon; and wherein the oxides of antimony are present in an amount of from about 0.5 weight percent to about 60 percent of the total weight of the oxides of aluminum, erbium, antimony, and silicon.

19. An optical gain fiber according to claim 15, wherein said core comprises no oxides of germanium or wherein said core comprises oxides of germanium in an amount less than about 20%, by weight, of the amount of total oxide in said core.

20. An optical gain fiber according to claim 12, wherein the erbium has an absorption band in the vicinity of 1530 nm, and wherein said optical gain fiber has a passive loss of between 0.05% and about 0.5% of the peak absorption of the absorption band in the vicinity of 1530 nm.

21. An optical gain fiber according to claim 12, wherein said optical gain fiber has a maximum gain of greater than about 15 dB per meter.

22. An optical gain fiber comprising:

a core comprising oxides of erbium; and a cladding surrounding the core, wherein said cladding comprises silicon dioxide, wherein the oxides of erbium have an absorption band in the vicinity of 1530 nm, wherein said optical gain fiber has a passive loss of less than about 0.5% of the peak absorption of the erbium absorption band in the vicinity of 1530 nm, and wherein said optical gain fiber has ripple of less than about 25% over about a 40 nm wide window or ripple of less than about 15% over about a 32 nm wide window, or both, wherein the core is substantially free of fluorine.

23. An optical gain fiber according to claim 22, wherein said optical gain fiber has ripple of less than about 25% over about a 40 nm wide window and ripple of less than about 15% over about a 32 nm wide window.

24. An optical gain fiber according to claim 22, wherein said optical gain fiber has a passive loss of between about 0.05% and 0.5% of the peak absorption of the erbium absorption band in the vicinity of 1530 nm.

25. An optical gain fiber according to claim 22, wherein said core further comprises oxides of silicon and oxides of aluminum.

26. An optical gain fiber according to claim 25, wherein said core further comprises oxides of one or more metals selected from the group consisting of yttrium, lanthanum, gadolinium, and lutetium.

27. An optical gain fiber according to claim 25, wherein said core further comprises oxides of antimony.

28. An optical gain fiber according to claim 27, wherein the oxides of aluminum are present in an amount of from about 6 weight percent to about 20 weight percent of the total weight of the oxides of aluminum, erbium, antimony, and silicon; wherein the oxides of the erbium are present in an amount of from about 0.05 weight percent to about 5 weight percent of the total weight of the oxides of aluminum, erbium, antimony, and silicon; and wherein the oxides of antimony are present in an amount of from about 0.5 weight percent to about 60 weight percent of the total weight of the oxides of aluminum, erbium, antimony, and silicon.

29. An optical gain fiber according to claim 25, wherein said core comprises no oxides of germanium or wherein said core comprises oxides of germanium in an amount less than about 20%, by weight, of the amount of total oxide in said core.

30. An optical gain fiber according to claim 22, wherein said optical gain fiber has a maximum gain of greater than about 15 dB per meter.

* * * * *